US010425804B2

(12) United States Patent
Gallmann et al.

(10) Patent No.: US 10,425,804 B2
(45) Date of Patent: Sep. 24, 2019

(54) SERVICE DIFFERENTIATION IN A NETWORK SHARING ARCHITECTURE

(71) Applicant: Alcatel Lucent, Boulogne Billancourt (FR)

(72) Inventors: Cristina Gallmann, Nozay (FR); Laurent Thiebaut, Nozay (FR); Eric Brigant, Rambouillet (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 14/350,252

(22) PCT Filed: Oct. 4, 2012

(86) PCT No.: PCT/EP2012/069559
§ 371 (c)(1),
(2) Date: Apr. 7, 2014

(87) PCT Pub. No.: WO2013/050435
PCT Pub. Date: Apr. 11, 2013

(65) Prior Publication Data
US 2014/0235236 A1    Aug. 21, 2014

(30) Foreign Application Priority Data
Oct. 7, 2011  (EP) .................................... 11290468

(51) Int. Cl.
*H04W 4/00*    (2018.01)
*H04W 8/02*    (2009.01)
*H04W 8/26*    (2009.01)

(52) U.S. Cl.
CPC ............... *H04W 8/02* (2013.01); *H04W 8/26* (2013.01); *H04W 4/00* (2013.01)

(58) Field of Classification Search
CPC ............ H04W 8/02; H04W 8/26; H04W 4/00
USPC ..................... 455/432.1, 435.1, 435.3, 433
See application file for complete search history.

(56) References Cited

U.S. PATENT DOCUMENTS

| | | | |
|---|---|---|---|
| 8,185,109 B2 * | 5/2012 | Watson et al. | ............. 455/435.1 |
| 2004/0162058 A1 * | 8/2004 | Mottes | .......................... 455/411 |
| 2008/0311907 A1 | 12/2008 | Watson | |
| 2009/0177650 A1 * | 7/2009 | Petersson | ............... G06Q 30/04 |

FOREIGN PATENT DOCUMENTS

| | | |
|---|---|---|
| CN | 1685758 A | 10/2005 |
| CN | 101523861 | 9/2009 |
| GB | 2 393 612 A | 3/2004 |
| GB | 2 431 547 A | 4/2007 |
| JP | 2008-99308 A | 4/2008 |

* cited by examiner

Primary Examiner — Marcos Batista
(74) Attorney, Agent, or Firm — Fay Sharpe LLP

(57) ABSTRACT

In an embodiment, there is provided a method for service differentiation in a network sharing architecture for a mobile network wherein an Access Network AN is shared by different Service Providers SPs, said method comprising at least one step based on an identification of an SP by an SP identity that does not require this SP to own a PLMD-Id, for service differentiation in said AN.

18 Claims, 5 Drawing Sheets

SERVICE DIFFERENTIATION IN A NETWORK SHARING ARCHITECTURE

The present invention generally relates to mobile communication networks and systems.

Detailed descriptions of mobile communication networks and systems can be found in the literature, such as in particular in Technical Specifications published by standardization bodies such as for example 3GPP (3$^{rd}$ Generation Partnership Project).

Examples of mobile communication systems include GPRS/UMTS (specified in particular in 3GPP TS 23.060) and Evolved Packet System EPS (specified in particular in 3GPP TS 23.401). Mobile communication systems (for example GPRS/UMTS, EPS) comprise a Core Network (for example GPRS/UMTS Core Network, Evolved Packet Core EPC) providing IP connectivity services, and accessed by User Equipment UE via a Radio Access Network RAN (for example GERAN/UTRAN, E-UTRAN). By way of example, an architecture for EPS is recalled in FIG. 1, taken from 3GPP TS 23.401.

Network sharing is a way for mobile operators to share the heavy deployment costs for mobile networks and is becoming more and more important. There may be various forms and scenarios of network sharing. Two configurations allowing different CN operators to share a RAN are identified in 3GPP TS 23.251: Multi-Operator Core Network (MOCN) and Gateway Core Network (GWCN). In the GWCN configuration, CN nodes interfacing with the shared RAN, also referred to as Access Gateway (such as for example MME or SGSN) are also shared.

As will be explained later with more detail, there is a need to improve service differentiation in a network sharing architecture allowing different Service Providers to share a common Access Network. More generally there is a need to improve network sharing in mobile networks.

Embodiments of the present invention in particular address such needs.

These and other objects are achieved, in one aspect, in an embodiment, by a method for service differentiation in a network sharing architecture for a mobile network wherein an Access Network AN is shared by different Service Providers SPs, said method comprising at least one step based on an identification of an SP by an SP identity that does not require this SP to own a PLMN-Id, for service differentiation in said AN.

These and other objects are achieved, in other aspects, by mobile network entities for performing such method.

Some embodiments of apparatus and/or methods in accordance with embodiments of the present invention are now described, by way of example only, and with reference to the accompanying drawings, in which.

Some embodiments of the present invention aim at enlarging currently available solutions for the case where the network/operator that provides the IP service and that owns the subscription of the user is different from the network/operator that provides the actual access to a licensed radio such as a 3gpp radio, especially in the case where the former network is not associated with a PLMN-Id. PLMN-Id is defined in 3gpp 23.003. A Public Land Mobile Network is uniquely identified by its PLMN identifier. PLMN-Id consists of Mobile Country Code (MCC) and Mobile Network Code (MNC).

In the following:
the operator that provides the IP service and that owns the subscription of the user is called the "Service Provider" (SP)
the operator that provides the actual access to a licensed radio such as a 3gpp radio is called the "Access Provider"

An Access Provider providing access to many SPs is sometimes referred as "wholesaler".

As the Access Provider delivers a 3gpp radio access service, it has to be associated with a PLMN-Id In many cases, such as when the user can roam between PLMN, the "Service Provider" owns itself a PLMN-Id but in some cases it does not own a PLMN-Id.

Possible solutions for the split between an Access Provider and a Service Provider are illustrated in FIGS. 2 to 5 showing different examples of network sharing, including cases where the SP has a PLMN-Id and cases where the SP has no PLMN-Id.

Cases where the Service Provider Has a PLMN-Id.

Figure 2:
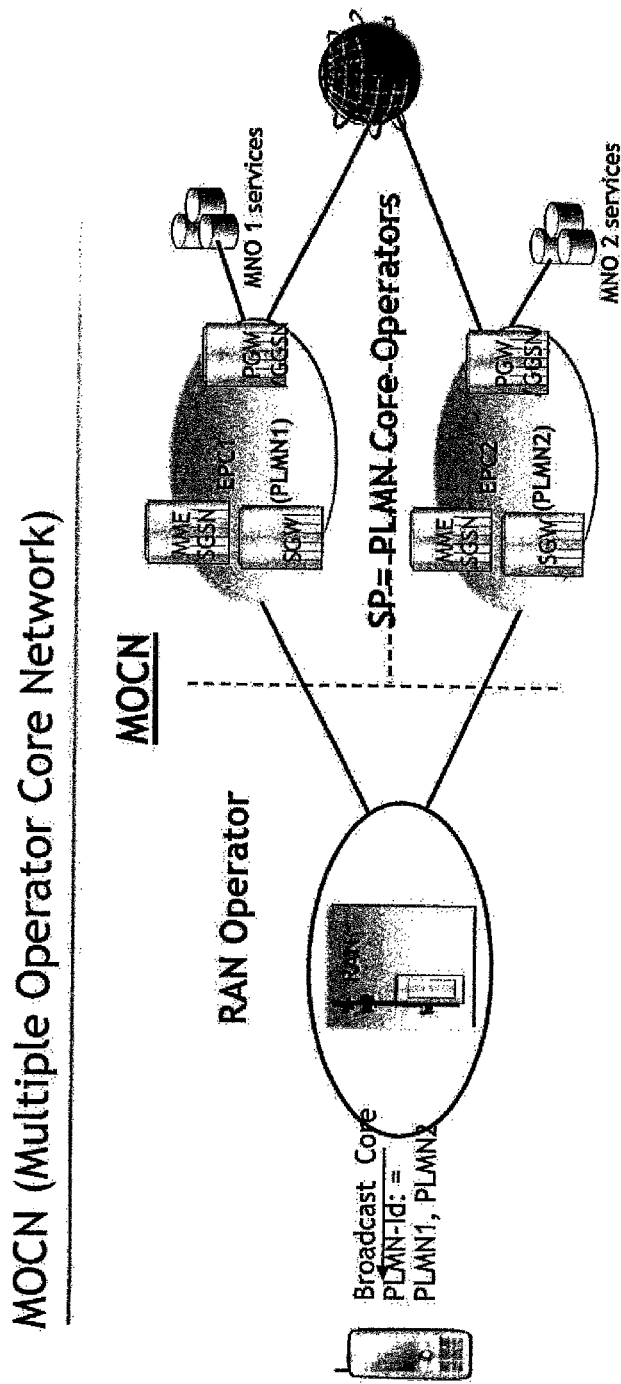
FIGS. 2 to 5 are intended to illustrate different examples of network sharing architecture for a mobile network.

Supporting a PLMN-Id means the Service Provider has to negotiate roaming agreements with all the PLMN worldwide which is cumbersome task 1) MOCN (Multiple Operator Core Network) such as defined in 3gpp TS 23.251. In this kind of deployment:
The Service Provider is a full PLMN that just delegates the RAN to another PLMN (RAN sharing). It is also called a "Core Operator" in this deployment.
The Identity of the Core operator is displayed on the UE (based on Core PLMN-Id)
The RAN knows which PLMN it is serving: service segregation/charging per service provider are possible.
When accessing to the Radio, the UE tells the RAN via relevant RRC (Radio Resource Control) which Core Operator it wants to access. This feature requires support from the UE (mandatory for LTE)
There are e.g. in RAN (e.g. ENB) configuration parameters defining min, max (%) resources per Core Operator (per QCI). These are configured by the Access (RAN) operator based on agreement with Core operator.
An Issue with this deployment is that: the RAN has the cumbersome task maintain CDR (Charging Records) per Core PLMN
Each Core enforces its own policies (roaming right, Control of RAN for HO policies, . . . )
This is depicted in FIG. 2

Figure 3:
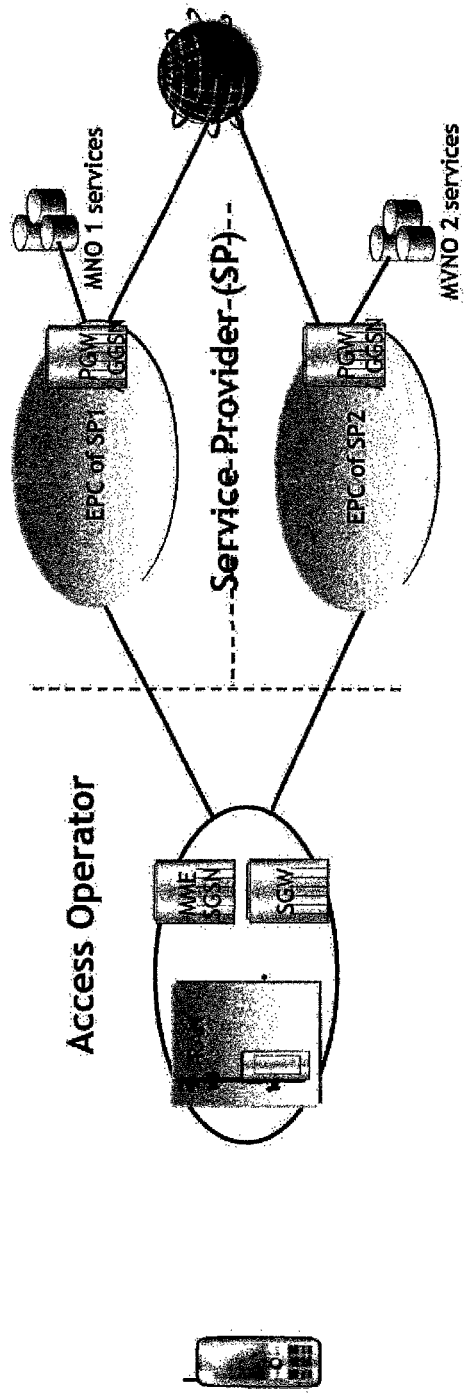

2) GWCN (Gateway Core Network) such as defined in 3gpp TS 23.251 when the Service Provider has a PLMN-Id. In this kind of deployment:
The Service Provider is either a full PLMN (this corresponds then to a basic roaming case) or is a MVNO with a PLMN-Id. Each operator (Access, Service Provider) has its own PLMN-Id.
The Identity of the Service Provider may be displayed on the UE (USIM parameters) when the UE is camping on the partner Access Provider
The RAN does NOT know which PLMN it is serving: service segregation per Service Provider not possible at RAN level
Core policies (roaming right, Control of RAN for HO policies, . . . ) are those of the Access operator (MVNO users are handled as roamers). The Access Operator knows the Identity of the Service Provider based on the PLMN-Id part of the IMSI This is depicted in FIG. 3

Cases where the Service Provider does not Have a PLMN-Id

In this case the Service Provider is hooked with a "partner" Access Provider as the IMSI of the users of the Service Provider are allocated within a range belonging to this partner Access Provider. On the other round this allows the SP to benefit from the roaming agreements of the partner Access Provider.

3) GWCN (Gateway Core Network) such as defined in 3gpp TS 23.251 when the Service Provider has not got a PLMN-Id. In this kind of deployment:

The PLMN-Id of the MVNO UE is the PLMN-Id of the partner Access operator (MNO)

The Identity of the Service Provider may be displayed on the UE (USIM parameters)

The RAN does NOT know which PLMN it is serving: service segregation per Service Provider not possible at RAN level Core policies (roaming right, Control of RAN for HO policies, . . . ) are those of the Access operator (MVNO users may be detected based on the IMSI range) (IMSI range used to charge the MVNO)

Figure 4:
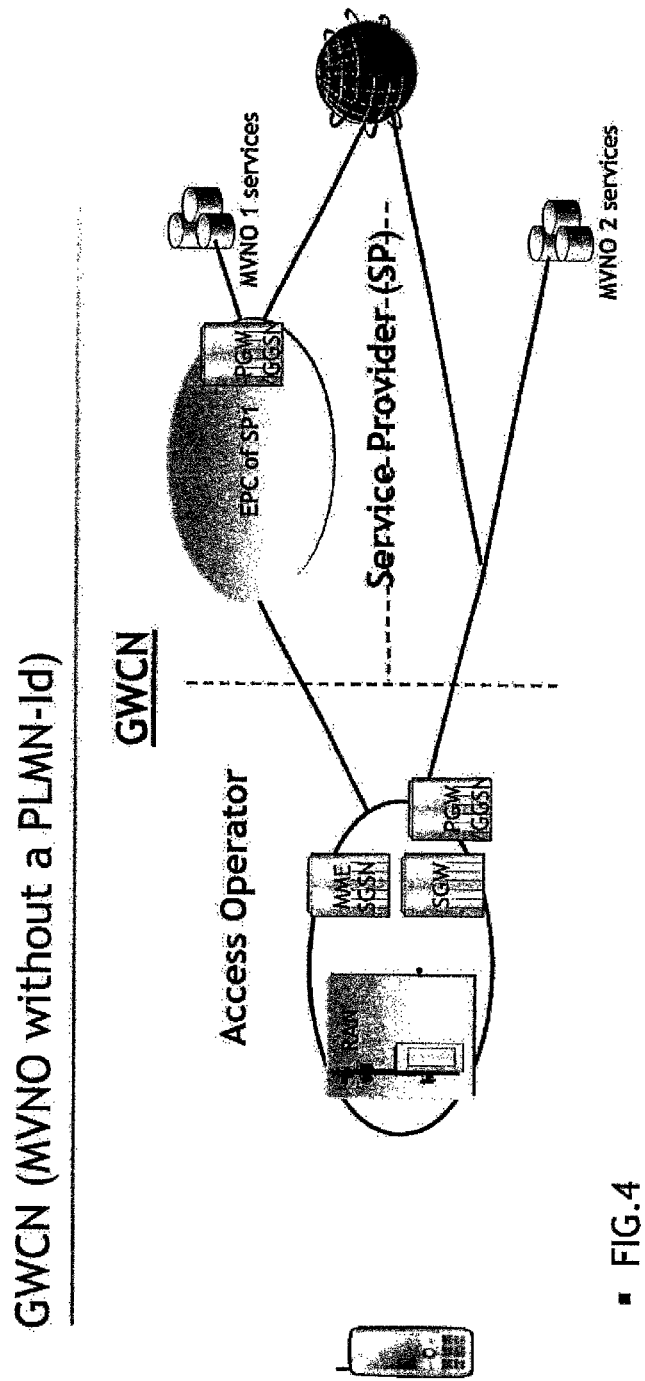

This is depicted in FIG. 4

4) The Service Provider is an ISP (Internet Service Provider) that desires to provide a Fixed Broadband Access to its users. In this kind of deployment (very similar to the previous case: GWCN without the MVNO having a PLMN-Id):

The PLMN-Id of the ISP UE is the PLMN-Id of the partner Access operator (MNO)

The Identity of the Service Provider may be displayed on the UE (USIM parameters)

The RAN does NOT know which PLMN it is serving: service segregation per Service Provider not possible at RAN level.

Core policies (roaming right, Control of RAN for HO policies, . . . ) are those of the partner Access operator (ISP users may be detected based on the IMSI range) (IMSI range used to charge the ISP)

Figure 5:
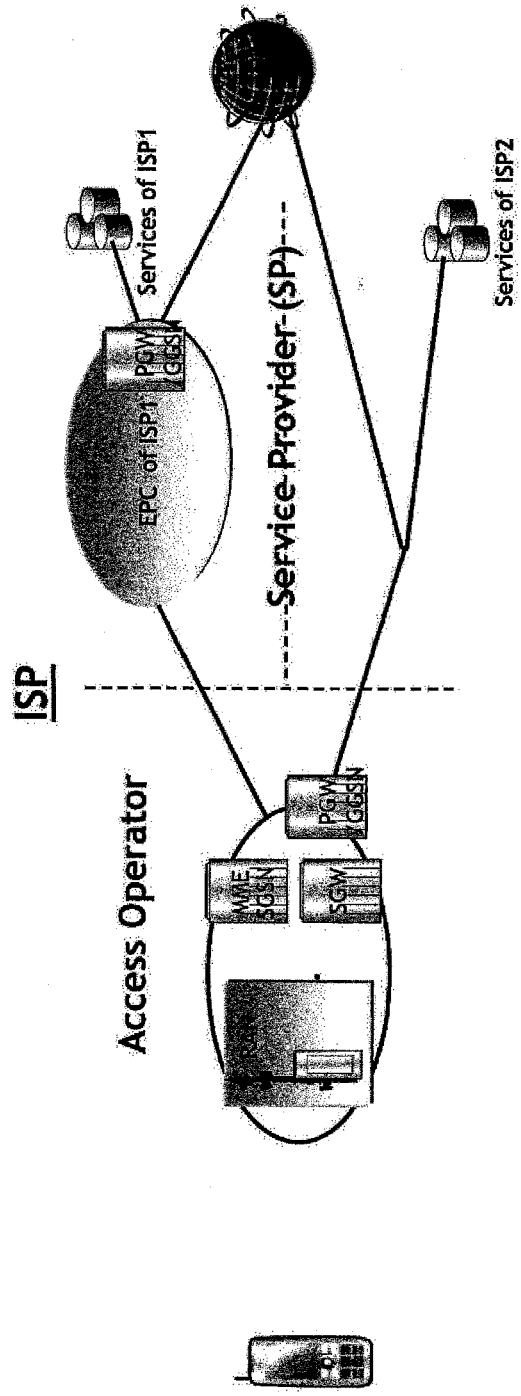

This is depicted in FIG. 5

To Summarize

Either (MVNO or GWCN when the Service Provider has a PLMN-Id) the Service Provider has a PLMN-Id and thus has to negotiate roaming agreements with all the PLMN worldwide which is cumbersome task.

Or the Service Provider has no PLMN-Id. In this case service segregation per Service Provider not possible at the level of the RAN of the Access Provider (Wholesaler). Thus the following features are not possible Service differentiation per Service Provider Issuing statistics at RAN level allowing to monitor the SLA between the Access Provider and Service Providers Embodiments of the present invention aim at determining solutions allowing the Access Provider to adapt its service based on the Identity of the Service Provider even though the Service Provider is not identified by a PLMN-Id.

Example of cases where the Access Provider adapts its service based on the Identity of the Service Provider (SP):

the RAN of the Access Provider may allocate to a given SP an aggregated minimum and/or maximum capacity over the radio interface and over the backhaul resources. This aggregated capacity may be set per QoS class and may e.g. correspond to throughput or to a number of bearers.

The RAN of the Access Provider may be given rules about which network (PLMN-Id, Radio Access Type) an UE of the SP may be handed-over to.

The RAN of the Access Provider may hold Performance & statistical counters allowing to monitor the SLA between the Access Provider (wholesaler) and each of the Service Providers Embodiments of the present invention provide a solution where the Service Provider does not need a PLMN-Id and thus does not need to negotiate roaming agreements with all the PLMN worldwide The Identity of the Service Provider is added onto the Interface of the RAN allowing service segregation per Service Provider at the level of the RAN of the Access Provider Embodiments of the present invention may be used in the cases where the Service Provider corresponds to e.g.

An MVNO without a PLMN-Id

An ISP

A corporate organisation (e.g. enterprise or public organisation).

In some embodiments of the present invention, the Service Provider Identity is used within RAN and MME/SGSN of the Access Operator like a PLMN-Id (e.g. leveraging or mimicking the configuration defined per PLMN-Id defining the min, max (%) of resources that may be allocated over the radio per Core Operator).

In some embodiments of the present invention, following steps may be provided:

1) The Access Operator determines the Identity of the Service Provider.

2) The Service Provider identity is used by the Access Gateway (MME or SGSN) of the Access Operator to steer the service it provides and is passed onto the Interface of the RAN (Gb, Iu, S1)

3) The RAN enforces service segregation per Service Provider. At Hand-Over, the Service Provider Identity should be passed from source RAN Node to target RAN Node.

Embodiments for implementing above-mentioned steps may be as follows:

1) The Access Operator determines the Identity of the Service Provider.

This determination may take place according to any of following mechanisms

Based on the IMSI range: Each Service Provider corresponds to a range within the IMSI addressing space of the partner Access Provider. The Access Gateway (MME or SGSN) of the partner Access Operator determines the Identity of the Service Provider based on this IMSI range.

i. This does not require modification of the interface of the Access Gateway (MME or SGSN)

ii. but can only apply in the Access Gateway (MME or SGSN) of the partner Access Provider.

Determined based on the APN: Some APN values are reserved to each Service Provider.

i. This does not require modification of the interface of the Access Gateway (MME or SGSN) but can only apply in the Access Gateway (MME or SGSN) of the partner Access Provider. Furthermore it may provide some difficulty when the APN should have a predefined value (like the one defined by GSMA for IMS)

Determined based on the subscription: the Identity of the service provider is passed from the HSS to the Access Gateway (MME or SGSN). This requires the addition of such a parameter over S6a/S6d/Gr (defined in 3gpp TS 29.272 and TS 29.002)

Determined based on PCRF policies: The PCRF, based on its policy rule engine (e.g. based on the IMSI range and/or some subscription parameters in the SPR, Service Policy Repository, holding the per user policy context, such as defined in 3gpp 23.203) determines the Identity of the service provider and passes it over Gx to the PGW/GGSN that may use it for its own policies (or for the Charging related information it creates) and passes it to the Access Gateway (MME or SGSN) over S5/S8 (Interfaces of the PGW/GGSN towards the SGW and MME/SGSN in 3gpp 23.401) and S4/S11.
  i. This mechanism provides more flexibility but requires more interface modifications
  ii. The PCRF may use the Identity of the service Provider as an input parameter to determine the QoS/charging/etc. policies to apply to an user.

In a shorter term, the solution based on the IMSI range may be the most likely as it involves no new interface. In a longer term, the solution based on PCRF determination may provide the best flexibility as especially the charging information held by all nodes (PGW, SGW) may contain the Identity of the Service Provider.

2) The Service Provider identity is used by the Access Gateway (MME or SGSN) of the Access Operator to steer the service it provides and is passed onto the Interface of the RAN (e.g. Gb, Iu, S1)

The Identity of the Service Provider is added as a parameter of
  BSSGP (for Gb/GERAN i.e. in 3gpp TS 48.018),
  RANAP (for Iu/UTRAN i.e. in 3gpp TS 25.413),
  S1-AP (for S1/ERAN i.e. in 3gpp TS 36.413),
  The Service Provider Identity is used within MME/SGSN of the Access Operator like a PLMN-Id (e.g. leveraging or mimicking the configuration defined per PLMN-Id for the inter-PLMN and inter-RAT Hand-Over policies of the MME/SGSN).

3) The RAN enforces service segregation per Service Provider. At Hand-Over, the Service Provider Identity should be passed from source RAN Node to target RAN Node.
  The Service Provider Identity is used within RAN of the Access Operator like a PLMN-Id (e.g. leveraging or mimicking the configuration defined per PLMN-Id defining e.g. the min, max (%) of resources that may be allocated over the radio per Core Operator).
  The Service Provider Identity is used within the RAN and the Access Gateway (e.g. MME/SGSN) of the Access Operator like a PLMN-Id to issue relevant statistics. These statistics are used to check the SLA between the Access Provider (Wholesale) and each of the Service Providers.
  The Service Provider Identity is used within the Access Gateway (e.g. MME/SGSN) of the Access Operator like a PLMN-Id to issue relevant charging information. These statistics are used by the Access Provider (Wholesale) to bill each of the Service Providers.
  the Service Provider Identity is passed from source RAN Node to target RAN Node in Hand-Over related signalling
  Anyhow the target Access Gateway (MME/SGSN) should also pass it to the target RAN, in case the Source Access Gateway or RAN would not support the feature An additional feature may be supported where the policy manager (PCRF) can optionally provide aggregated QoS parameters per Service Provider in addition with the policy rules for a given user.
  The PCRF provides the aggregated QoS parameters per Service Provider to the RAN via PCC related communication channels (Gx to the PGW then S5 to the SGW, then S4/S11 to MME/SGSN then over Gb/Iu/S1)
  This assumes the PCRF is the entity of the Access Operator that determines the Identity of the Service Provider.

Figure 1:
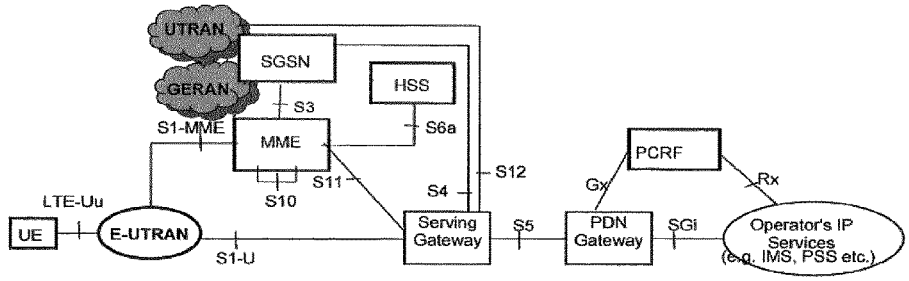
FIG. 1 is intended to recall an example of architecture for EPS.
Figure 6:
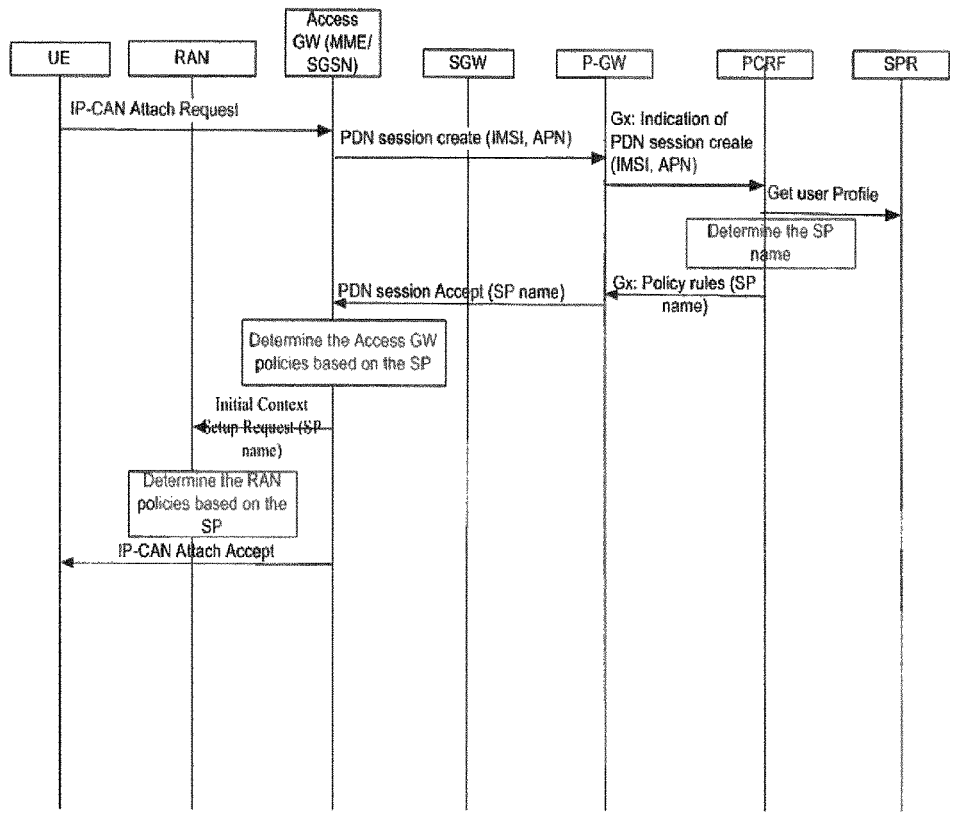
FIG. 6 is intended to illustrate an example of procedure carried out at initial access to a shared network, in EPS by way of example, according to embodiments of the present invention.

FIG. 6 is intended to illustrate in a simplified way an example of procedure carried out at initial access to a shared network, in EPS by way of example, according to embodiments of the present invention.

FIG. 6 is intended to illustrate in a simplified way some modifications necessary for the determination of the SP name by the PCRF and notification of this attribute to the Access Gateway (MME/SGSN) and to the RAN.

Following steps may be provided:
  The UE sends an Attach Request message to the Access Gateway (MME/SGSN).
  The Access Gateway (MME/SGSN) sends a Create Session Request message (containing IMSI, APN) to a P-GW selected based on the APN.
  The P-GW sends an Indication of Create Session Request message (containing IMSI, APN) to the PCRF.
  The PCRF sends a Get User Profile request to the SPR.
  The PCRF (having received the User Profile) determines the SP name.
  The PCRF may use the SP name to determine further policy rules (QoS, rating group for the IP-CAN session)
  The PCRF sends Policy Rules containing the SP name to the P-GW.
  The P-GW sends a Create Session Response message containing the SP name to the Access Gateway (MME/SGSN).
  The Access Gateway (MME/SGSN) determines the Access Gateway policies based on the SP name.
  The Access Gateway (MME/SGSN) sends an Initial Context Setup Request message containing the SP name to the RAN.
  The RAN determines the RAN policies based on the SP name.
  The Access Gateway (MME/SGSN) sends an Attach Accept message to the UE.

In one aspect, there is provided a method for service differentiation in a network sharing architecture for a mobile network wherein an Access Network AN is shared by different Service Providers SPs.

In an embodiment, said method comprises at least one step based on an identification of an SP by an SP identity that does not require this SP to own a PLMN-Id, for service differentiation in said AN.
  In an embodiment, said method comprises a step of:
  a mobile network entity determining an SP identity.
  In an embodiment, said method comprises a step of:
  a mobile network entity providing an SP identity to another mobile network entity.
  In an embodiment, said method comprises a step of:
  an AN entity adapting its service based on an SP identity.
  In an embodiment, said method comprises a step of:
  an AN entity determining its policies based on an SP identity.

In an embodiment, said method comprises a step of:
an AN entity determining its roaming and/or handover policies based on an SP identity.

In an embodiment, said method comprises a step of:
determining an SP identity based on an IMSI range within an IMSI addressing space of an Access Provider operating said AN.

In an embodiment, said method comprises a step of:
determining an SP identity based on an Access Point Name APN value reserved for said SP.

In an embodiment, said method comprises a step of:
determining an SP identity based on subscription information.

In an embodiment, said method comprises a step of:
determining an SP identity based on policies managed by a policy manager.

In an embodiment:
said AN comprises a Radio Access Network RAN.

In an embodiment:
said AN comprising a Radio Access Network RAN and one or more Core Network CN nodes connected to said RAN.

In an embodiment, said method comprises a step of determining an SP identity performed by at least one of:
MME or SGSN
PCRF.

In an embodiment, said method comprises at least one of the steps of:
HSS providing an SP identity to MME or SGSN,
PCRF providing an SP identity to P-GW,
P-GW providing an SP identity to MME or SGSN,
MME or SGSN providing an SP identity to RAN.

In an embodiment, said method comprises at least one of the steps of:
MME or SGSN determining its policies based on an SP identity
RAN determining its policies based on an SP identity.

Other aspects relate to mobile network entities configured for performing such method.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for service differentiation in a network sharing architecture for a mobile network wherein an access network is shared by different service providers, wherein a service provider is identified by a service provider identity that does not require this service provider to own a public land mobile network identity, the method comprising:
determining said service provider identity based on information including policy and charging rules function policies, and
using said service provider identity for service differentiation between service providers in said access network.

2. The method according to claim 1, comprising:
an access gateway adapting a service of the access gateway based on said service provider identity.

3. The method according to claim 1, comprising:
an access gateway determining policies of the access gateway based on said service provider identity.

4. The method according to claim 1, wherein:
said service provider identity is determined based on information including an international mobile subscriber identity.

5. The method according to claim 1, wherein:
said service provider identity is determined based on information including an access point name.

6. The method according to claim 1, wherein:
said service provider identity is determined based on information including subscription information.

7. The method according to claim 1, comprising:
a policy and charging rules function determining said service provider identity.

8. The method according to claim 1, comprising at least one of:
a policy and charging rules function providing said service provider identity to a packet data network gateway,
a packet data network gateway providing said service provider identity to an access gateway, or
the access gateway providing said service provider identity to a radio access network entity.

9. The method according to claim 1, comprising:
a policy and charging rules function using said service provider identity as an input parameter to determine at least one of quality of service policies and charging policies.

10. The method according to claim 1, comprising:
a radio access network entity adapting a service of the radio access network entity based on said service provider identity.

11. The method according to claim 1, comprising:
a radio access network entity determining policies of the radio access network entity based on said service provider identity.

12. A policy and charging rules function, for a mobile network comprising an access network shared by different service providers, said policy and charging rules function comprising:
a memory configured to store computer-readable instructions; and
at least one processor configured to execute said computer-readable instructions to cause said policy and charging rules function to:
determine, based on information including policy and charging rules function policies, a service provider identity, said service provider identity identifying a service provider without requiring this service provider to own a public land mobile network identity;
wherein said service provider identity is configured to be used for service differentiation between service providers in said access network.

13. The policy and charging rules function according to claim 12, wherein said at least one processor is configured to execute said computer-readable instructions to cause said policy and charging rules function to:
send said service provider identity to a packet data network gateway.

14. The policy and charging rules function according to claim 12, wherein said at least one processor is configured to execute said computer-readable instructions to cause said policy and charging rules function to:

use said service provider identity as an input parameter to determine at least one of quality of service policies and charging policies.

15. A packet data network gateway, for a mobile network comprising an access network shared by different service providers, said packet data network gateway comprising:
   a memory configured to store computer-readable instructions; and
   at least one processor configured to execute said computer-readable instructions to cause said packet data network gateway to:
      receive, from a policy and charging rules function, a service provider identity identifying a service provider without requiring this service provider to own a public land mobile network identity;
   wherein said service provider identity is configured to be used for service differentiation between service providers in said access network.

16. The packet data network gateway according to claim 15, wherein said at least one processor is configured to execute said computer-readable instructions to cause said packet data network gateway to:
   send said service provider identity towards an access gateway.

17. An access gateway, for a mobile network comprising an access network shared by different service providers, said access gateway comprising:
   a memory configured to store computer-readable instructions; and
   at least one processor configured to execute said computer-readable instructions to cause said access gateway to:
      receive from a packet data network gateway a service provider identity, said service provider identity identifying a service provider without requiring this service provider to own a public land mobile network identity;
   wherein said service provider identity is configured to be used for service differentiation between service providers in said access network.

18. The access gateway according to claim 17, wherein said at least one processor is configured to execute said computer-readable instructions to cause said access gateway to:
   send said service provider identity towards a radio access network entity.

* * * * *